United States Patent
Iwamura et al.

(10) Patent No.: US 10,259,265 B2
(45) Date of Patent: Apr. 16, 2019

(54) AIRLESS TIRE AND METHOD OF MANUFACTURING SAME

(71) Applicant: Sumitomo Rubber Industries, Ltd., Kobe-shi (JP)

(72) Inventors: Wako Iwamura, Kobe (JP); Makoto Sugiya, Kobe (JP)

(73) Assignee: Sumitomo Rubber Industries, Ltd., Kobe-shi (JP)

(*) Notice: Subject to any disclaimer, the term of this patent is extended or adjusted under 35 U.S.C. 154(b) by 106 days.

(21) Appl. No.: 15/310,660

(22) PCT Filed: May 7, 2015

(86) PCT No.: PCT/JP2015/063178
§ 371 (c)(1),
(2) Date: Nov. 11, 2016

(87) PCT Pub. No.: WO2015/174313
PCT Pub. Date: Nov. 19, 2015

(65) Prior Publication Data
US 2017/0072746 A1 Mar. 16, 2017

(30) Foreign Application Priority Data
May 14, 2014 (JP) ................................. 2014-100769

(51) Int. Cl.
*B60C 7/14* (2006.01)
*B29D 30/02* (2006.01)
(Continued)

(52) U.S. Cl.
CPC ................ *B60C 7/14* (2013.01); *B29D 30/02* (2013.01); *B60C 13/001* (2013.01);
(Continued)

(58) Field of Classification Search
CPC .. B60C 7/14; B60C 7/143; B60C 7/18; B60C 2007/146; B60C 13/001; B29D 30/02
See application file for complete search history.

(56) References Cited

U.S. PATENT DOCUMENTS

2004/0159385 A1* 8/2004 Rhyne ...................... B60B 9/04
152/197
2006/0113016 A1* 6/2006 Cron .......................... B60C 7/18
152/11
(Continued)

FOREIGN PATENT DOCUMENTS

EP  2 418 098 A2  2/2012
EP  2 418 098 A3  2/2012
(Continued)

OTHER PUBLICATIONS

Extended Search Report dated Oct. 13, 2017 in European Patent Application No. 15792285.7.
(Continued)

*Primary Examiner* — Kip T Kotter
(74) *Attorney, Agent, or Firm* — Oblon, McClelland, Maier & Neustadt, L.L.P.

(57) ABSTRACT

An airless tire has a cylindrical tread ring 2 having a ground-contacting surface 21, a hub disposed on the radially inside of the tread ring 2 and fixed to an wheel shaft, and spokes connecting between the tread ring 2 and the hub. The tread ring 2 has a side wall 22 continued from the ground-contacting surface 21 and forming a ring side surface. The side wall 22 has a supporting portion 23 which, when the tread ring 2 alone is horizontally laid on a horizontal surface H, contacts with a horizontal surface H and supports the tread ring 2 so that a ring axis A2 is oriented in a direction perpendicular to the horizontal surface H.

20 Claims, 7 Drawing Sheets

(51) Int. Cl.
  *B60C 13/00* (2006.01)
  *B29K 621/00* (2006.01)
  *B29L 30/00* (2006.01)
  *B29K 705/00* (2006.01)
  *B29K 105/20* (2006.01)
  *B29K 105/24* (2006.01)

(52) U.S. Cl.
  CPC ...... *B29K 2105/20* (2013.01); *B29K 2105/24* (2013.01); *B29K 2621/00* (2013.01); *B29K 2705/00* (2013.01); *B29L 2030/006* (2013.01); *B60C 2007/146* (2013.01)

(56) References Cited

U.S. PATENT DOCUMENTS

| | | | |
|---|---|---|---|
| 2007/0267116 A1 | 11/2007 | Rhyne et al. | |
| 2008/0314486 A1* | 12/2008 | Manesh | B60C 7/14 152/328 |
| 2009/0107596 A1* | 4/2009 | Palinkas | B29D 30/02 152/209.1 |
| 2009/0173421 A1* | 7/2009 | Love | A63C 17/22 152/246 |
| 2010/0078111 A1* | 4/2010 | Anderson | B60C 17/04 152/520 |
| 2011/0290394 A1* | 12/2011 | Luchini | B60C 7/10 152/302 |
| 2012/0038206 A1 | 2/2012 | Chadwick et al. | |
| 2013/0278045 A1* | 10/2013 | Dotson | B29D 30/02 301/79 |
| 2013/0287882 A1* | 10/2013 | Wilson | B29D 30/02 425/425 |
| 2014/0034219 A1 | 2/2014 | Chadwick et al. | |
| 2015/0017277 A1 | 1/2015 | Anderson et al. | |
| 2015/0122382 A1* | 5/2015 | Choi | B60C 7/18 152/17 |
| 2015/0246587 A1* | 9/2015 | Muhlhoff | B60C 13/001 152/523 |
| 2016/0089935 A1 | 3/2016 | Iwamura et al. | |

FOREIGN PATENT DOCUMENTS

| | | |
|---|---|---|
| EP | 3 000 619 A1 | 3/2016 |
| JP | 5-200753 | 8/1993 |
| JP | 2005-14229 A | 1/2005 |
| JP | 2008-260514 A | 10/2008 |
| JP | 2014-507311 A | 3/2014 |
| WO | WO 2013/130047 A2 | 9/2013 |
| WO | WO 2013/130047 A3 | 9/2013 |

OTHER PUBLICATIONS

International Search Report dated Jul. 14, 2015 in PCT/JP15/063178 Filed May 7, 2015.

* cited by examiner

AIRLESS TIRE AND METHOD OF MANUFACTURING SAME

TECHNICAL FIELD

The present invention relates to an airless tire and a method of manufacturing the same in which the uniformity can be improved.

BACKGROUND ART

There has been proposed an airless tire having a structure in which a cylindrical tread ring having a ground contacting surface, and a hub fixed to a wheel shaft are coupled by a plurality of radially arranged spoke plate portions (e.g., see Patent Document 1).

Similarly to a pneumatic tire, an airless tire is also required to have an improved tire uniformity in order to suppress vibrations of the tire during rolling. For improving the uniformity of the airless tire, it is important that the axis of the tread ring coincides with the axis of the hub with a high degree of accuracy.

PRIOR ART DOCUMENT

Patent Document

Patent Document 1: Japanese Patent Application Publication No. 2008-260514

For example, an airless tire is manufactured by injecting a resin material for forming spokes into a cavity in a mold, after placing a tread ring and a hub therein, and being cured.

The tread ring and the hub are horizontally laid on a horizontal surface formed in the mold in order to make the ring axis coinciding with the hub axis.

When a side wall of the tread ring has sprues and/or protruding characters showing the tire size and the like, if the tread ring is horizontally laid on the horizontal surface of the mold, then, between the side wall of the tread ring and the horizontal surface of the mold, the sprues, characters and the like lie unevenly in the circumferential direction. As a result, the inclination of the ring axis becomes not perpendicular to the horizontal surface of the mold, and the ring axis becomes not coincident with the hub axis, which may affect the uniformity.

SUMMARY OF THE INVENTION

Problems to be Resolved by the Invention

The present invention was made in view of the circumstances as described above, and it is a primary object to provide an airless tire and a method of manufacturing the same in which the uniformity can be improved by maintaining the inclination of a tread ring axis being perpendicular to a horizontal surface when the tread ring alone is horizontally laid on the horizontal surface.

Means of Solving the Problems

The present invention is an airless tire having a cylindrical tread ring having a ground contacting surface, a hub disposed on the radially inside of the tread ring and fixed to a wheel shaft, and spokes connecting between the tread ring and the hub, characterized in that the tread ring has a side wall continued from the ground contacting surface and forming a ring side surface, and the side wall has a supporting portion for supporting the tread ring so that, when the tread ring alone is horizontally laid on a horizontal surface, the supporting portion contacts with the horizontal surface, and a ring axis is oriented in a direction perpendicular to the horizontal surface.

In the airless tire according to the present invention, it is preferable that the supporting portion is a flat surface continuous in the tire circumferential direction.

In the airless tire according to the present invention, it is preferable that a plurality of the supporting portions are provided intermittently in the tire circumferential direction.

In the airless tire according to the present invention, it is preferable that the side wall has a concave letter or pattern recessed from the supporting portion toward the inside in the tire axial direction.

In the airless tire according to the present invention, it is preferable that sprues overflowed from mold parting surfaces of a mold for vulcanization molding the tread ring, are formed in the supporting portion uniformly in the tire circumferential direction.

In the airless tire according to the present invention, it is preferable that, in a front view of the side wall, the area of the supporting portion is from 10% to 100% of the area of the side wall.

The present invention is a method of manufacturing an airless tire having a cylindrical tread ring having a ground contacting surface, a hub disposed on the radially inside of the tread ring and fixed to an wheel shaft, and spokes connecting between the tread ring and the hub, in which the tread ring has a side wall continued from the ground contacting surface and forming a ring side surface, and which is characterized by comprising a step of forming, on the side wall of the tread ring, a supporting portion for supporting the tread ring such that, when the tread ring alone is horizontally laid on a horizontal surface, the supporting portion contacts with the horizontal surface and a ring axis is oriented in a direction perpendicular to the horizontal surface, a step of preparing a mold defining a cavity for molding the spokes, and having a horizontal surface for holding the tread ring and the hub, a step of laying the tread ring and the hub on the horizontal surface of the mold, and a step of injecting a material for forming the spokes into the cavity of the mold and curing it.

Effects of the Invention

The airless tire of the present invention has the tread ring having the ground contacting surface, the hub disposed on the radially inside of the tread ring, and the spokes connecting between the tread ring and the hub.

The side wall forming the side surface of the tread ring has the supporting portion which contacts with a horizontal surface when the tread ring alone is horizontally laid on the horizontal surface and supports the tread ring.

The supporting portion supports the tread ring so that the ring axis under the laid state of the tread ring is oriented in the direction perpendicular to the horizontal surface.

Thereby, the ring axis coincides with the hub axis or the tire axis of the airless tire 1 with a high degree of accuracy, and the uniformity of the airless tire is improved.

The method of manufacturing an airless tire of the present invention includes a step of forming the supporting portion on the side wall of the tread ring, a step of preparing the mold defining the cavity for molding the spokes, a step of laying the tread ring and the hub in the mold, and a step of injecting the material for forming the spokes into the cavity of the mold and curing it.

In the step of forming the supporting portion on the side wall of the tread ring, there is formed the supporting portion which contacts with the horizontal surface when the tread ring alone is horizontally laid on the horizontal surface.

The supporting portion supports the tread ring in the laid state of the tread ring so that the ring axis is oriented in the direction perpendicular to the horizontal surface.

The mold has a horizontal surface for holding the tread ring and the hub.

As a result of the tread ring and the hub being horizontally laid on the horizontal surface of the mold, the ring axis and the hub axis coincide with each other with a high degree of accuracy, and the uniformity of the airless tire is improved.

BRIEF DESCRIPTION OF THE DRAWINGS

FIG. 7 A cross sectional view of the casting mold in

FIG. 6 taken along line B-B.

MODE FOR CARRYING OUT THE INVENTION

Hereinafter, an embodiment of the present invention will be described with reference to the drawings.

Figure 1:
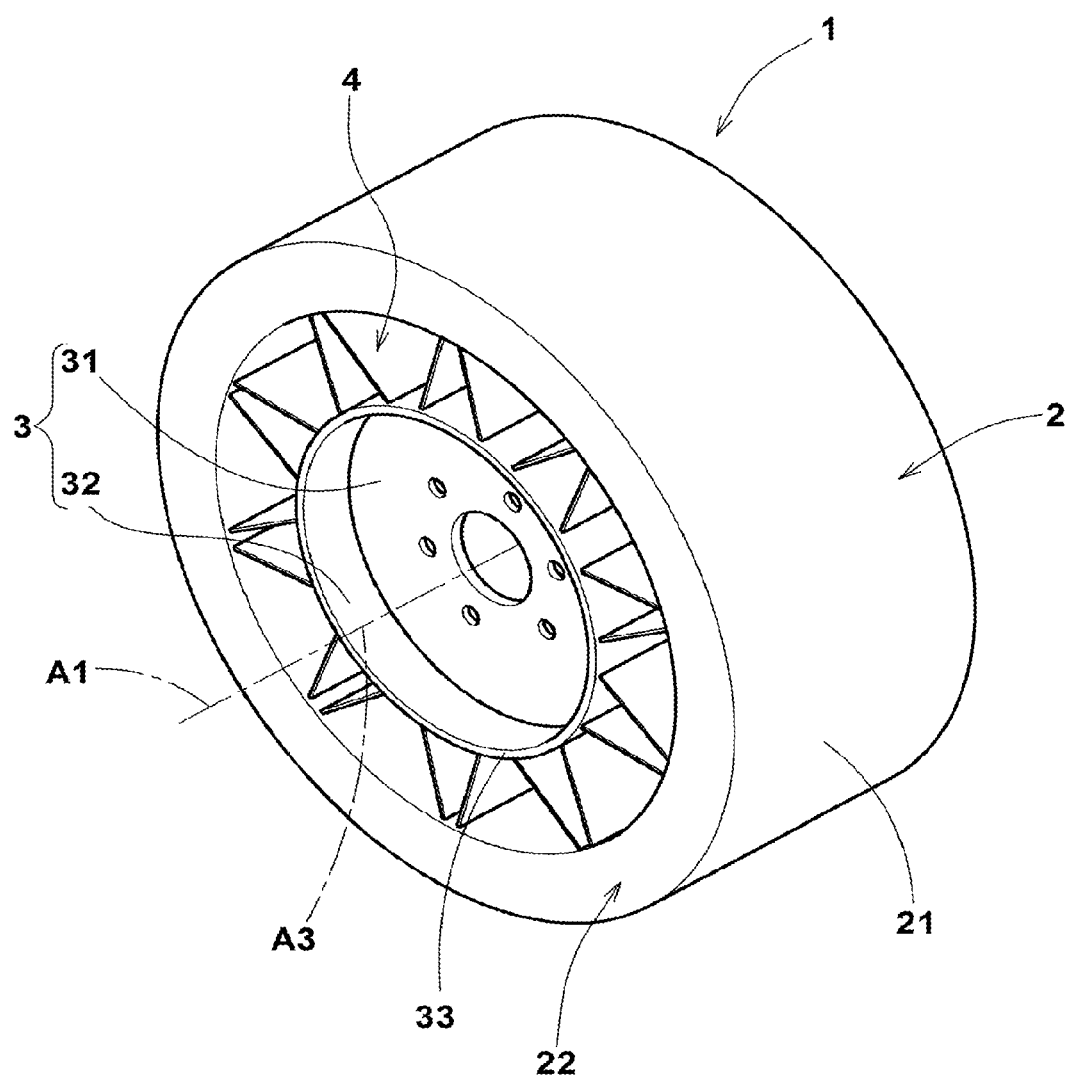
FIG. 1 A perspective view showing an embodiment of the airless tire of the present invention.

FIG. 1 is a perspective view of an airless tire 1 according to the present embodiment.

As shown in FIG. 1, the airless tire 1 of the present embodiment has a cylindrical tread ring 2 having a ground contacting surface 21, a hub 3 disposed on the radially inside of the tread ring 2 and fixed to a wheel shaft, and spokes 4 connecting between the tread ring 2 and the hub 3.

In the present embodiment, shown is a case in which the airless tire 1 is formed as a passenger car tire.

Figure 2:
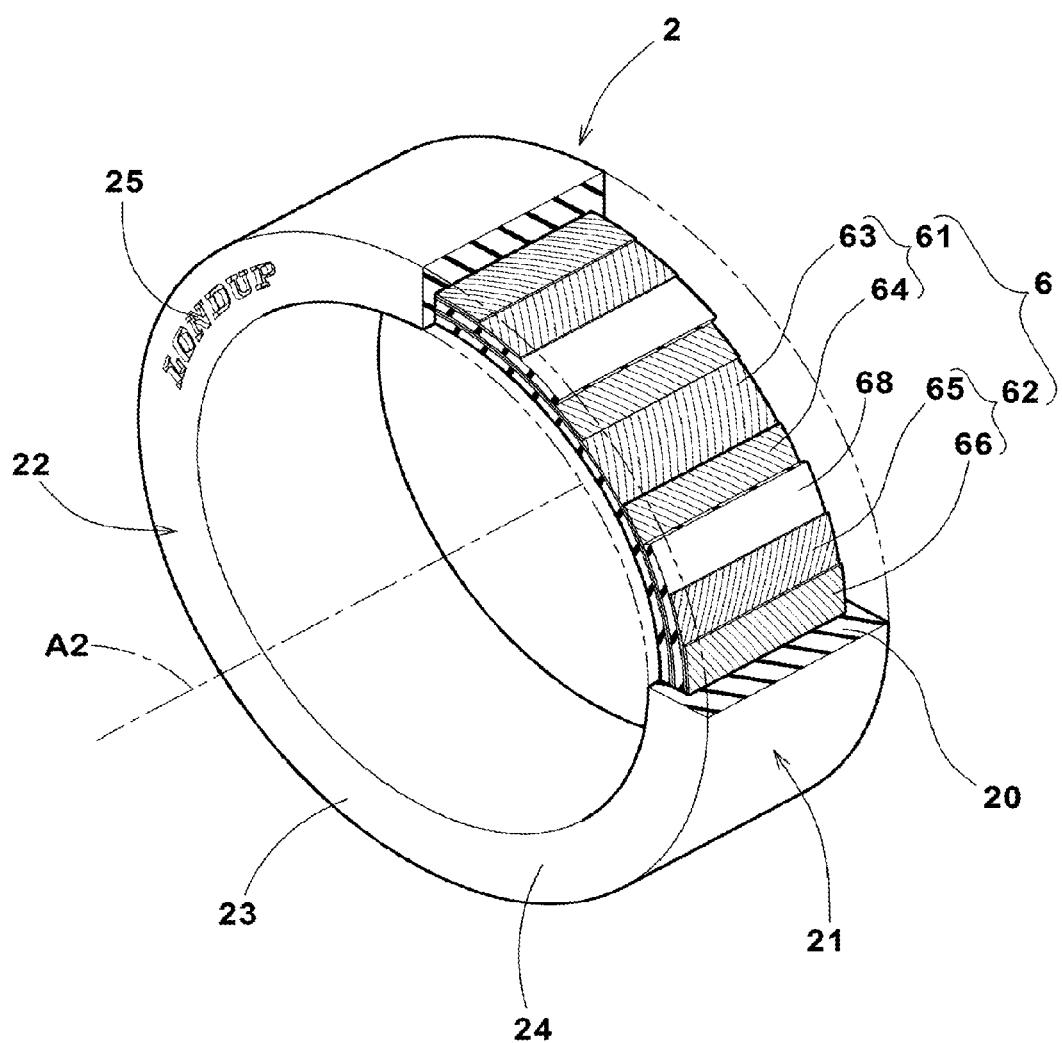
FIG. 2 A perspective view showing a tread ring in FIG. 1.

FIG. 2 shows the tread ring 2. The tread ring 2 has the ground contacting surface 21, and a side wall 22 being continuous from the ground contacting surface 21 and forming a ring side surface. The tread ring 2 has a reinforcing cord layer 6 embedded in a tread rubber portion 20.

For the tread rubber portion 20, a rubber compound which excels in the friction on the ground and the wear resistance is preferably used.

In the ground contacting surface 21 which is an outer circumferential surface of the tread ring 2, tread grooves (not shown) are formed in various configurations in order to provide wet performance.

The reinforcing cord layer 6 of the present embodiment has a first belt layer 61, and a second belt layer 62 laid radially outside the first belt layer.

Between the first belt layer 61 and the second belt layer 62, a shear layer 68 made of a rubber having high hardness is disposed. The reinforcing cord layer 6 may be formed by only the first belt layer 61.

The first belt layer 61 is composed of at least one ply, in this example two belt plies 63 and 64, of tire cords arranged at an angle of for example 10 to 45 degrees with respect to the tire circumferential direction.

Similarly, the second belt layer 62 is composed of at least one ply, in this example two belt plies 65 and 66, of tire cords arranged at an angle of for example 10 to 45 degrees with respect to the tire circumferential direction.

Between the plies, the respective tire cords mutually intersect, and thereby, the rigidity of the tread ring 2 is increased. It is desirable that the thickness of the shear layer 68 is, for example, 2 to 7 mm.

A band ply in which a tire cord is wound helically in the tire circumferential direction may be disposed radially outside the second belt layer 62 where appropriate.

As the tire cords of the first belt layer 61 and the second belt layer 62, steel cords and organic fiber cords can be used as appropriate.

In the case of the organic fiber cords, high modulus fibers such as high strength high modulus aramid, polyethylene naphthalate (PEN), polyethylene terephthalate (PET) can be suitably employed.

Such tread ring 2 is formed by forming a raw tread ring in advance, and then, vulcanization molding the raw tread ring within a vulcanization mold.

The raw tread rings is formed on a cylindrical drum by circumferentially sequentially winding a sheet-like member for forming the first belt layer 61, a sheet-like member for forming the shear layer 68, a sheet-like member for forming the second belt layer 62, and a sheet-like member for forming the tread rubber portion 20.

As shown in FIG. 1, the hub 3 has a disk portion 31 fixed to a wheel shaft, and a cylindrical portion 32 formed at the outer circumference of the disk portion 31.

A side wall 33 is formed at an edge of the cylindrical portion 32. The side wall 33 is made up of a flat surface perpendicular to the hub axis A3.

The hub 3 can be made of a metal material, for example, steel, aluminum alloy, magnesium alloy or the like as in the conventional tire wheels.

The spokes 4 are formed by cast molding of a polymer material.

The spoke 4 has a plate-like shape, and a plurality of the spokes are disposed in the tire circumferential direction.

Figure 3:
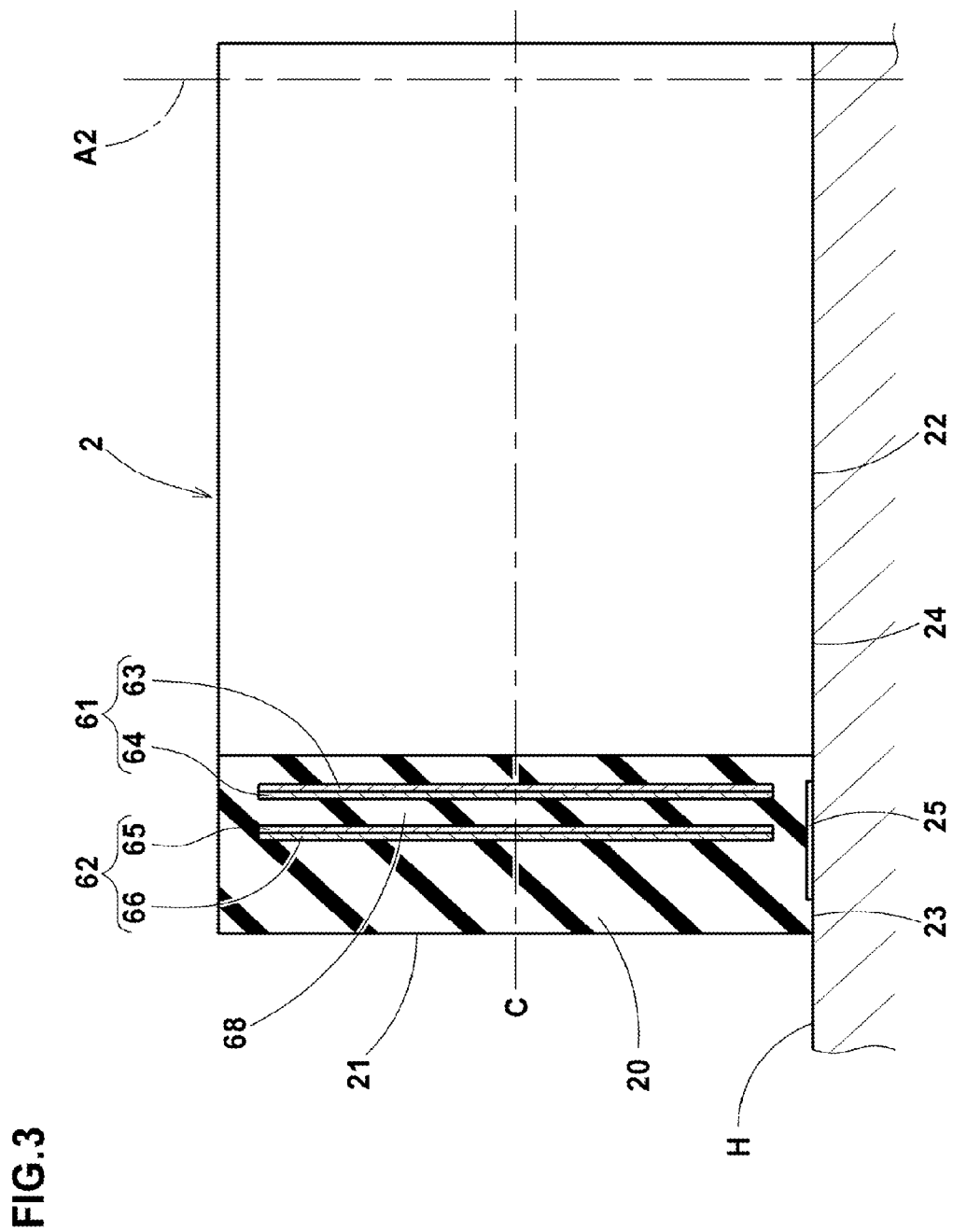
FIG. 3 A cross-sectional view of the tread ring in FIG. 2 in the state horizontally laid on the horizontal surface.

FIG. 3 shows a state of the tread ring 2 horizontally laid on a horizontal surface H.

The expression "horizontally laid" refers to a state being put on a horizontal surface H in a lay down posture so that the side wall 22 of the tread ring 2 becomes opposite to the horizontal surface H.

The side wall 22 of the tread ring 2 is provided with a supporting portion 23 contacting with the horizontal surface H when the tread ring 2 alone is horizontally laid on the horizontal surface H to support the tread ring 2.

The support portion 23 projects outward most in the axial direction of the tread ring 2 so as to contact with the horizontal surface H when the tread ring 2 is horizontally laid. The supporting portion 23 supports the tread ring 2 such that the ring axis A2 is oriented in a direction perpendicular to the horizontal surface H when the tread ring 2 is horizontally laid. On the other hand, when the hub 3 is horizontally laid on the horizontal surface H, the side wall 33 supports the hub 3 so that the hub axis A3 is oriented in a direction perpendicular to the horizontal surface H.

Thereby, the ring axis A2 of the tread ring 2 coincides with the hub axis A3 of the hub 3 shown in FIG. 1, that is, the tire axis A1 of the airless tire 1 with a high degree of accuracy, and the uniformity of the airless tire 1 is improved.

In this embodiment, as shown in FIG. 2, the supporting portion 23 is a flat surface 24 which is continuous in the tire circumferential direction.

The flat surface 24 constituting the supporting portion 23 is the side surface of the main body of the tread ring 2, which is parallel with the tire equatorial plane, namely, perpendicular to the ring axis A2.

As the supporting portion 23 is continuous in the tire circumferential direction, the lay down posture of the tread ring 2 becomes more stable, and it becomes possible to coincide the ring axis A2 of the tread ring 2 with the hub axis A3 of the hub 3 with a high degree of accuracy.

The side wall 22 of the tread ring 2 is provided with characters 25 denoting the brand name, size and the like of the airless tire 1.

Likewise, the side wall 22 of the tread ring 2 may be patterned (not shown) in order to improve the ornamental design of the airless tire 1.

As already mentioned, since the supporting portion 23 is formed by the flat surface 24 at the axially outermost position of the tread ring 2, the characters 25 and the like of the present embodiment are concaves which are recessed axially inwardly from the supporting portion 23.

Such characters 25 and the like do not adversely effect on the contact between the supporting portion 23 and the horizontal surface H, therefore, the orientation of the ring axis A2 with respect to the horizontal surface H can be maintained vertically.

It is desirable that the supporting portion 23 has no sprues sucked into air channels of a mold used to vulcanization molding the tread ring 2.

Similarly, it is desirable that the supporting portion 23 has no sprues overflowed from mold parting surfaces of the mold used to vulcanization molding the tread ring 2. In the case where overflow sprues are formed in the supporting portion 23, it is desirable that the overflow sprues are formed uniformly in the tire circumferential direction.

As a result of the overflow sprues formed uniformly in the tire circumferential direction, the orientation of the ring axis A2 with respect to the horizontal surface H can be maintained vertically.

It is preferable that, in a front view of the side wall 22, the area of the supporting portion 23 is at least 10% of the area of the side wall 22.

If the area of the supporting portion 23 is less than 10% of the area of the side wall 22, there is a possibility that the supporting portion 23 is deformed when the tread ring 2 is laid on the horizontal surface H, and the direction of the ring axis A2 with respect to the horizontal surface H is varied.

Most preferably, the area of the supporting portion 23 is 100% of the area of the side wall 22, namely, the entire side wall 22 is constituted by the supporting portion 23.

In this case, the deformation of the supporting portion 23 can be minimized, therefore, it becomes possible to maintain the orientation of the ring axis A2 with respect to the horizontal surface H with high accuracy.

Figure 4:
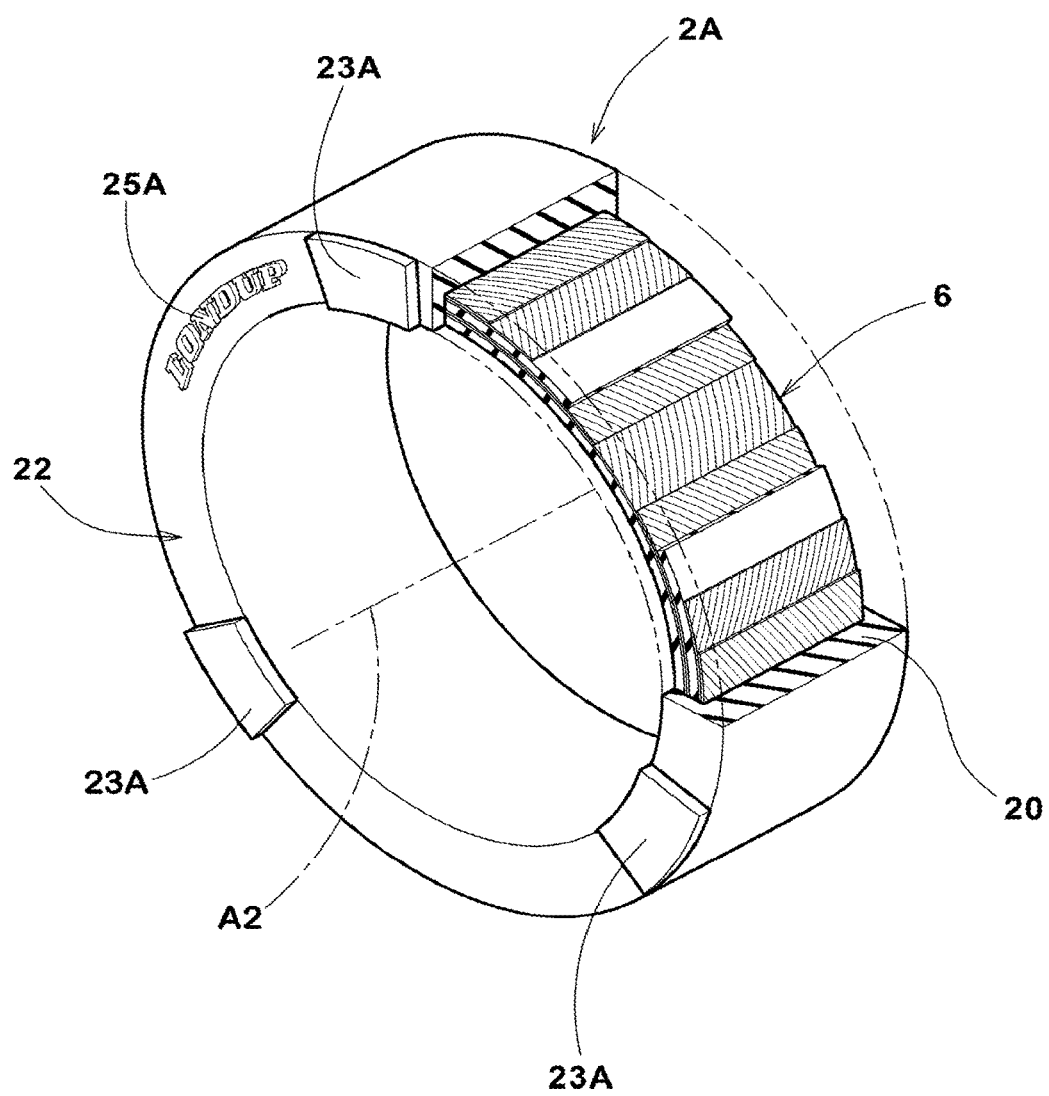
FIG. 4 A perspective view showing a modification of the tread ring in FIG. 2.

FIG. 4 shows a tread ring 2A which is a modification of the tread ring 2. In this tread ring 2A, a plurality of supporting portions 23A are provided intermittently in the tire circumferential direction.

The supporting portions 23A protrude outwardly in the axial direction of the tread ring 2A from the side surface of the main body of the tread ring 2A.

The support portions 23A support the tread ring 2A so that the ring axis A2 is oriented in a direction perpendicular to the horizontal surface H when the tread ring 2A is horizontally laid. Thereby, the ring axis A2 of the tread ring 2A coincides with the hub axis A3 of the hub 3 or the tire axis A1 of the airless tire 1 with high accuracy, and the uniformity of the airless tire 1 is improved.

In the tread ring 2A, since the supporting portions 23A protrude from the main body of the side wall 22 of the tread ring 2A, characters 25A denoting the brand name, size and the like of the airless tire 1 can be formed so as to protrude from the main body of the side wall 22 of the tread ring 2A. In this case, the protruding height of the characters 25A is less the protruding height of the supporting portions 23A. If the protruding height of the characters 25A is equal to the protruding height of the supporting portions 23A, the character 25A or the like constitute part of the supporting portions 23A in substance.

It is desirable that, in a front view of the side wall 22, the area S3 of the supporting portions 23A is more than 10% of the area S2 of the side wall 22.

If the area S3 of the supporting portions 23A is less than 10% of the area S2 of the side wall 22, there is a possibility that the supporting portions 23A are deformed when the tread ring 2A is horizontally laid on the horizontal surface H, and the direction of the ring axis A2 with respect to the horizontal surface H is varied.

Figure 5:
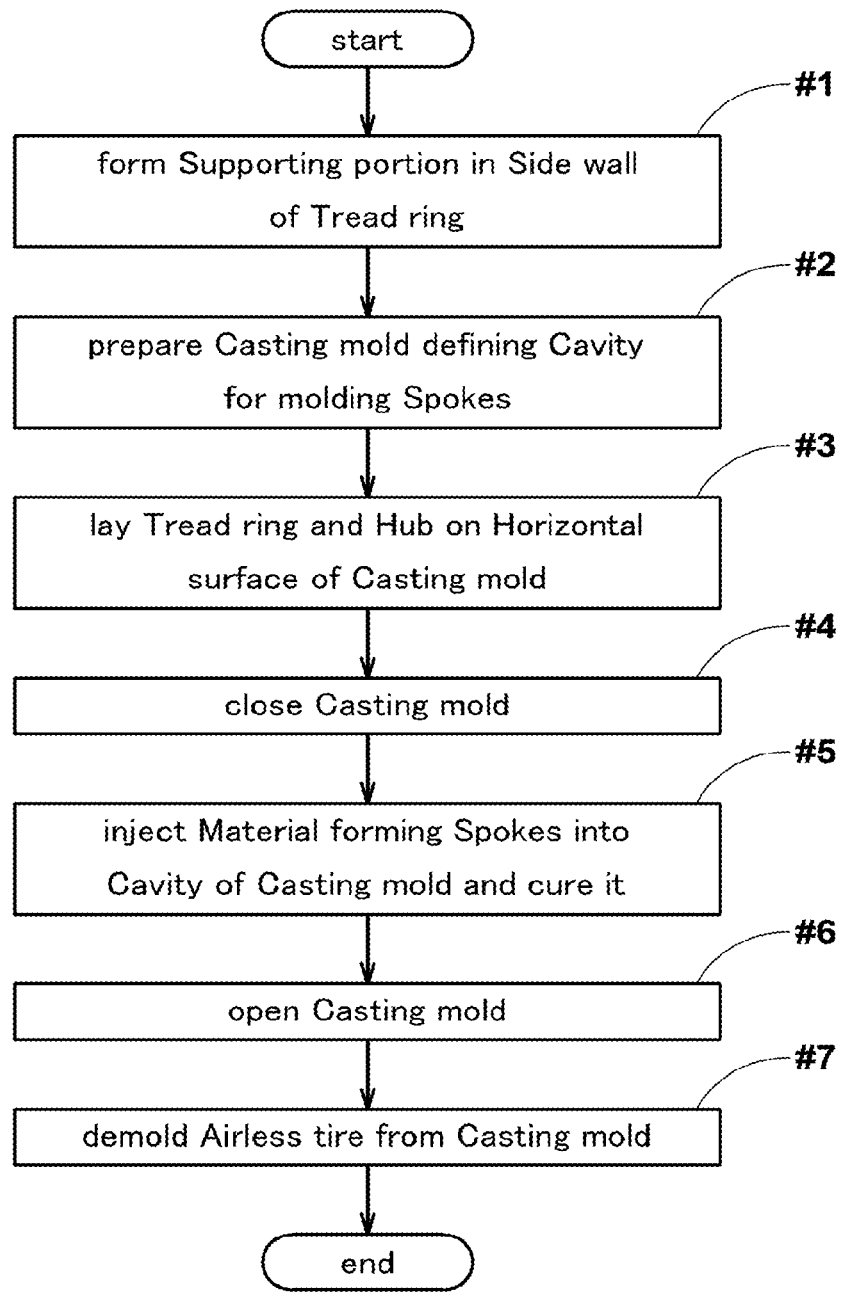
FIG. 5 A flow chart showing an example of the steps of the method of manufacturing the airless tire in FIG. 1.

FIG. 5 is a flowchart exemplifying the steps of a method of manufacturing the airless tire 1. As shown in FIG. 5, the method of manufacturing the airless tire 1 comprises a step (#1) of forming the supporting portion 23 in the side wall 22 of the tread ring 2, a step (#2) of preparing a casting mold defining the cavity for molding the spokes 4, a step (#3) of horizontally laying the tread ring 2 and the hub 3 on the horizontal surface of the casting mold, a step (#4) of closing the casting mold, a step (#5) of injecting the material forming the spokes 4 into the cavity of the casting mold, and curing it, a step (#6) of opening the casting mold, and a step (#7) of demolding the airless tire 1 from the casting mold.

In the step (#1), there is formed the supporting portion 23 which contacts with the horizontal surface H when the tread ring 2 alone is horizontally laid on the horizontal surface H. The supporting portion 23 supports the tread ring 2 in the horizontally laid state of the tread ring 2 so that the ring axis A2 is oriented in a direction perpendicular to the horizontal surface H.

In this embodiment, by the use of a vulcanization mold for vulcanization molding the tread ring 2, the supporting portion 23 is molded together with the ground contacting surface 21 and the main body of the side wall 22.

Figure 6:
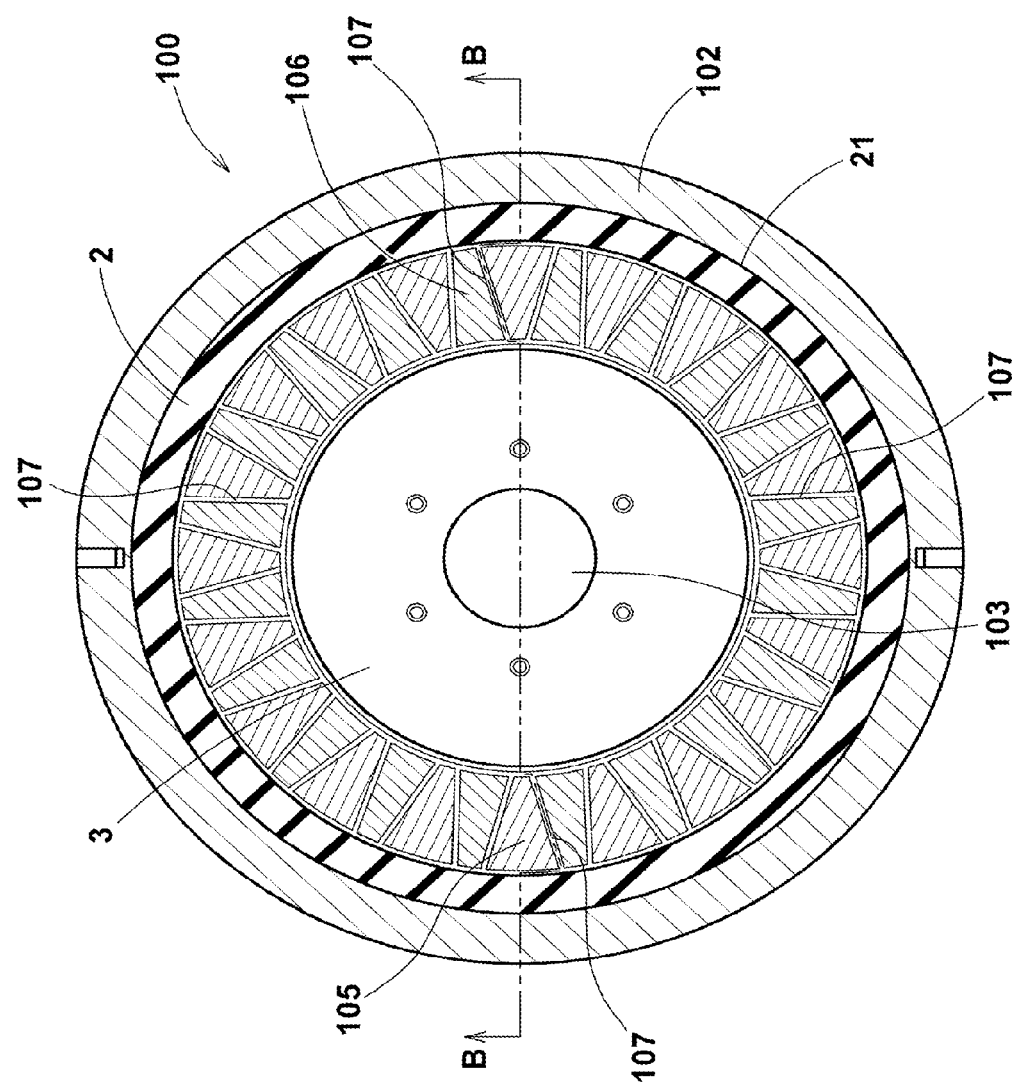
FIG. 6 A plan view of a casting mold used to mold the spokes of the airless tire in FIG. 1
Figure 7:
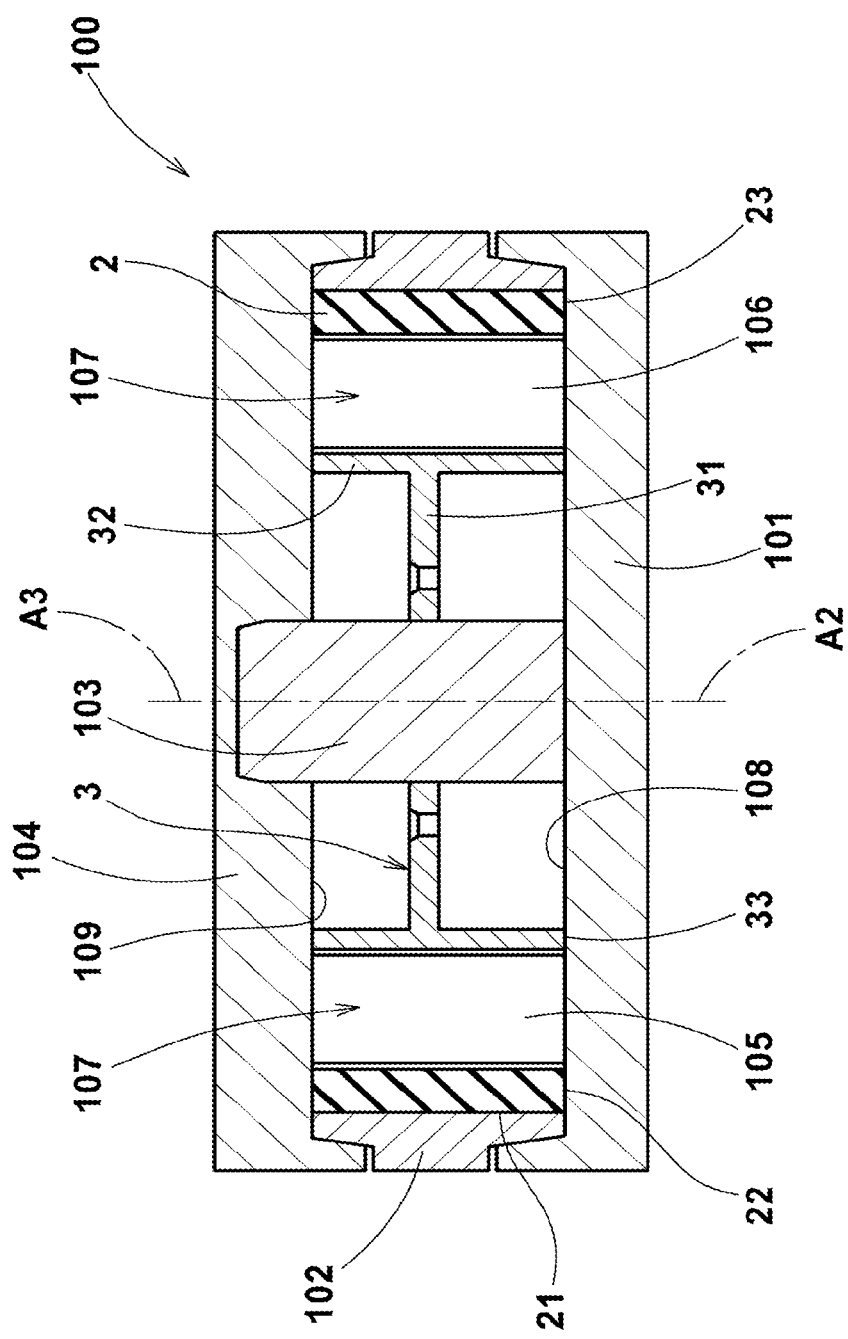

FIGS. 6 and 7 show the casting mold 100 for molding the spokes 4 of the airless tire 1 prepared in the step (#2). The casting mold 100 has a first side part 101, an outer circumferential part 102, an inner circumferential part 103, and a second side part 104.

The first side part 101 comes into contact with the side walls 22 and 33 on one side, of the tread ring 2 and the hub 3 which are laid horizontally.

The outer circumferential part 102 positions and holds the ground contacting surface 21 of the tread ring 2.

The inner circumferential part 103 positions and holds the inner circumferential surface of the hub 3.

The second side part 104 contacts with the side walls 22 and 33 on the other side, of the tread ring 2 and the hub 3.

The first side part 101 and second side part 104 are provided with first spoke forming portions 105 and second spoke forming portions 106 which are comb-shaped and for forming the spokes 4.

The first spoke forming portions 105 and the second spoke forming portions 106 are arranged alternately in the tire circumferential direction, and protrude into a space between the inner circumferential surface of the tread ring 2 and the outer circumferential surface of the hub 3.

A cavity 107 for molding the spokes 4 is partitioned by the inner circumferential surface of the tread ring 2, the outer circumferential surface of the hub 3, the first side part 101, the first spoke forming portions 105, the second side part 104, and the second spoke forming portions 106.

As shown in FIG. 7, the first side part 101 has a horizontal surface 108 for holding the tread ring 2 and the hub 3. Similarly, the second side part 104 has a horizontal surface 109 for holding the tread ring 2 and the hub 3.

In the step (#3), the tread ring 2 and the hub 3 are horizontally laid on the horizontal surface 108 of the casting mold 100.

At this time, the tread ring 2 is positioned and held by the horizontal surface 108 of the first side part 101, the outer circumferential part 102, and the horizontal surface 109 of the second side part 104.

The supporting portion 23 is in contact with the horizontal surface 108, and supports the tread ring 2 so that the ring axis A2 is oriented in a direction perpendicular to the horizontal surface 108.

similarly, the hub 3 is positioned and held by the horizontal surface 108 of the first side part 101, the inner circumferential part 103, and the horizontal surface 109 of the second side part 104.

The side wall 33 of the hub 3 supports the hub 3 so that the hub axis A3 is oriented in a direction perpendicular to the horizontal surface 108.

Thus, the hub axis A3 of the hub 3 and the ring axis A2 of the tread ring 2 are arranged parallel with each other. Further, the ground contacting surface 21 of the tread ring 2 is positioned in the radial direction by the outer circumferential part 102, and
the inner circumferential surface of the hub 3 is positioned in the radial direction by the inner circumferential part 103, therefore, the tread ring 2 and the hub 3 are accurate centered, and the ring axis A2 coincides with the hub axis A3 with a high degree of accuracy. Thus, the uniformity of the airless tire 1 is improved.

In the subsequent step (#4), the second side part 104 is moved, and the casting mold 100 is closed.

Thus, the cavity 107 for molding the spokes 4 is made out within the casting mold 100.

In the step (#5), the resin material for forming the spokes 4 is injected into the cavity 107 and cured.

Thereby, the tread ring 2 is united with the hub 3 through the spokes 4, and the airless tire 1 is formed.

As to the injected resin material, a thermoplastic resin or a thermosetting resin can be used.

From the viewpoint of safety, the thermosetting resins, for example, epoxy resins, phenolic resins, urethane resins, silicone resins, polyimide resins, melamine resins and the like are preferred.

Particularly, urethane-based resins can be used more preferably because of the excellent elastic properties.

In the subsequent step (#6), the second side part 104 is moved upward in FIG. 7 to open the casting mold 100.

In the step (#7), the airless tire 1 is demolded from the casting mold 100.

While detailed description has been made of the airless tire and the method of manufacturing the same according to the present invention, the present invention can be embodied in various forms without being limited to the illustrated embodiments.

WORKING EXAMPLES

Airless tires having the basic structure in FIG. 1 were experimentally manufactured based on the specifications listed in Table 1. And the stability of the tread ring itself in the lay down posture, the RRO, and the vibration of a vehicle were evaluated.

<Stability in Lay Down Posture>

The tread ring alone was horizontally laid on a horizontal surface, and the stability of the posture was sensorily evaluated by a tester.

<RRO>

The airless tire was measured for the RRO at a tire equator portion and both shoulder portions, and their average value was calculated. In the results, a smaller value is better.

<Vehicle Vibration Test>

Small electrical vehicles fitted with the respective airless tires were brought into a test course, and vibrations during running were sensorily evaluated by a tester.

In the results, "A" denotes a level where no vibrations were felt, "B" denotes a level where vibrations being acceptable in the market were felt, and "C" denotes a level where large vibrations being not acceptable in the market were felt.

TABLE 1

|  | comparative example | working example 1 | working example 2 | working example 3 | working example 4 | working example5 | working example 6 | working example 7 | working example 8 |
|---|---|---|---|---|---|---|---|---|---|
| supporting portion(s) | absent | present | present | present | present | present | present | present | present |
| form of supporting portion(s) | — | continuous | continuous | continuous | continuous | intermittent | intermittent | intermittent | intermittent |
| number of supporting portion(s) | 0 | 1 | 1 | 1 | 1 | 3 | 3 | 3 | 3 |
| form of characters or the like | convex | none | concave | concave | concave | concave | convex | concave | concave |
| spews | present | absent | absent | present | absent | absent | absent | absent | absent |
| overflow spews | present | absent | absent | absent | present (uniform) | absent | absent | absent | absent |
| S3/S2 (%) | 0 | 100 | 95 | 95 | 95 | 50 | 50 | 10 | 5 |
| stability in lay down posture (grade) | unstable | stable | stable | stable | stable | stable | stable | stable | stable |
| average RRO (mm) | 2.5 | 0.5 | 0.6 | 0.7 | 0.7 | 0.8 | 0.8 | 0.9 | 1.0 |
| vehicle vibration test (grade) | C | A | A | A | A | A | A | A | B |

As shown in Table 1, it was confirmed that the airless tires as Working Examples were improved in the uniformity as compared to comparative examples.

DESCRIPTION OF THE SIGNS 1 airless tire
2 tread ring
2A tread ring
3 hub
4 spoke
21 ground contacting surface
22 side wall
23 supporting portion
23A supporting portion
25 character
25A character
100 casting mold
108 horizontal surface
A2 ring axis
H horizontal surface

The invention claimed is:

1. An airless tire, comprising:
a tread ring having a cylindrical form and a ground contacting surface;
a hub positioned on a radially inside of the tread ring and configured to be fixed to a wheel shaft; and
a plurality of spokes positioned between the tread ring and the hub such that the plurality of spokes is connecting the tread ring and the hub,
wherein the tread ring has a side wall extending from the around contacting surface and forming a ring side surface, the side wall has a supporting portion configured to support the tread ring such that when the tread ring alone is horizontally laid on a horizontal surface, the supporting portion contacts with the horizontal surface and that a ring axis of the tread ring is oriented in a direction perpendicular to the horizontal surface, and the supporting portion is formed in a plurality such that the plurality of supporting portions are intermittently provided in the tire circumferential direction.

2. The airless tire as set forth in claim 1, wherein the tread ring is formed such that the side wall has concave letters or patterns recessed inwardly in a tire axial direction from the supporting portion.

3. The airless tire as set forth in claim 2, wherein the tread ring is formed such that in a front view of the side wall, the plurality of supporting portions has an area which is in a range of 10% to 100% of an area of the side wall.

4. The airless tire as set forth in claim 3, wherein the tread ring comprises a tread rubber portion and a reinforcing cord layer embedded in the tread rubber portion.

5. The airless tire as set forth in claim 4, wherein the plurality of spokes is made of resin material.

6. The airless tire as set forth in claim 2, wherein the tread ring comprises a tread rubber portion and a reinforcing cord layer embedded in the tread rubber portion.

7. The airless tire as set forth in claim 6, wherein the plurality of spokes is made of resin material.

8. The airless tire as set forth in claim 1, wherein the tread ring is formed such that in a front view of the side wall, the plurality of supporting portions has an area which is in a range of 10% to 100% of an area of the side wall.

9. The airless tire as set forth in claim 8, wherein the tread ring comprises a tread rubber portion and a reinforcing cord layer embedded in the tread rubber portion.

10. The airless tire as set forth in claim 9, wherein the plurality of spokes is made of resin material.

11. The airless tire as set forth in claim 1, wherein the tread ring comprises a tread rubber portion and a reinforcing cord layer embedded in the tread rubber portion.

12. The airless tire as set forth in claim 11, wherein the plurality of spokes is made of resin material.

13. The airless tire as set forth in claim 11, wherein the plurality of supporting portions has three supporting portions.

14. The airless tire as set forth in claim 11, wherein the reinforcing cord layer comprises a belt layer.

15. The airless tire as set forth in claim 11, wherein the reinforcing cord layer comprises a first belt layer, a second belt layer and a shear layer interposed between the first belt layer and the second belt layer.

16. The airless tire as set forth in claim 11, wherein the reinforcing cord layer comprises a belt layer comprising at least one belt ply of tire cords.

17. The airless tire as set forth in claim 11, wherein the reinforcing cord layer comprises a first belt layer comprising at least one belt ply of tire cords, a second belt layer comprising at least one belt ply of tire cords, and a shear layer interposed between the first belt layer and the second belt layer.

18. The airless tire as set forth in claim 1, wherein the plurality of spokes is made of resin material.

19. The airless tire as set forth in claim 1, wherein the plurality of supporting portions has three supporting portions.

20. A method of manufacturing an airless tire, comprising:
forming, on a side wall of a tread ring, a plurality of supporting portions configured to support the tread ring such that when the tread ring alone is horizontally laid on a horizontal surface, the plurality of supporting portions are intermittently provided in the tire circumferential direction and contact with the horizontal surface and that a ring axis of the tread ring is oriented in a direction perpendicular to the horizontal surface;
preparing a mold having a cavity configured to mold a plurality of spokes and a horizontal surface configured to hold the tread ring and a hub;
laying the tread ring and the hub on the horizontal surface of the mold;
injecting, into the cavity of the mold, a material which forms the plurality of spokes; and
curing the material such that an airless tire is formed and has the tread ring having a cylindrical form and a ground contacting surface, the hub positioned on a radially inside of the tread ring and configured to be fixed to an wheel shaft, and the plurality of spokes positioned between the tread ring and the hub and connecting the tread ring and the hub and that the tread ring has the side wall extending from the ground contacting surface and forming a ring side surface.

* * * * *